(12) United States Patent
Fischer et al.

(10) Patent No.: US 6,872,377 B2
(45) Date of Patent: Mar. 29, 2005

(54) PREPARATION OF HYDROGEN PEROXIDE FROM HYDROGEN AND OXYGEN

(75) Inventors: Martin Fischer, Ludwigshafen (DE); Thomas Butz, Ludwigshafen (DE); Klemens Massonne, Bad Duerkheim (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 241 days.

(21) Appl. No.: 10/194,229

(22) Filed: Jul. 15, 2002

(65) Prior Publication Data

US 2003/0017094 A1 Jan. 23, 2003

(30) Foreign Application Priority Data

Jul. 16, 2001 (DE) .......................................... 101 34 470

(51) Int. Cl.$^7$ .............................................. C01B 15/01
(52) U.S. Cl. ...................................................... 423/584
(58) Field of Search .......................................... 423/584

(56) References Cited

U.S. PATENT DOCUMENTS

| | | | | |
|---|---|---|---|---|
| 4,832,938 A | * | 5/1989 | Gosser et al. ................ | 423/584 |
| 5,360,603 A | * | 11/1994 | Drnevich et al. ........... | 423/584 |
| 5,500,202 A | * | 3/1996 | Germain et al. ............ | 423/584 |
| 6,375,920 B2 | * | 4/2002 | Fischer et al. .............. | 423/584 |
| 6,649,140 B2 | * | 11/2003 | Paparatto et al. ........... | 423/584 |
| 6,713,036 B1 | * | 3/2004 | Vanden Bussche et al. . | 423/584 |

* cited by examiner

*Primary Examiner*—Wayne A. Langel
(74) *Attorney, Agent, or Firm*—Oblon, Spivak, McClelland, Maier & Neustadt, P.C.

(57) ABSTRACT

In a process for preparing an aqueous and/or alcoholic solution of hydrogen peroxide by reaction of hydrogen and oxygen in a trickle-bed reactor over a supported catalyst including a noble metal, the apparent flow direction of the gas stream and the apparent flow direction of the liquid stream are not parallel to one another. The apparent flow direction of the gas stream preferably runs radially from the longitudinal axis to the circumference of the reactor. The process allows high gas throughputs with a small pressure drop.

12 Claims, 3 Drawing Sheets

PREPARATION OF HYDROGEN PEROXIDE FROM HYDROGEN AND OXYGEN

BACKGROUND OF THE INVENTION

1. Field of the Invention

The present invention relates to a process for preparing an aqueous and/or alcoholic solution of hydrogen peroxide by reaction of hydrogen and oxygen over a stationary catalyst comprising a noble metal.

2. Discussion of the Background

The synthesis of hydrogen peroxide from hydrogen and oxygen over heterogeneous catalysts has been described many times. Thus, EP-A 0 579 109 describes the direct synthesis of hydrogen peroxide in a fixed-bed reactor operated in the downflow mode. Here, the catalyst is present as a fixed bed in the reactor. A gas stream comprising hydrogen and oxygen and a liquid aqueous stream are passed through the reactor in cocurrent from the top downward.

The factor which limits the formation rate of hydrogen peroxide is, at a given catalyst activity, the amount of reaction gases present at the surface of the catalyst. One restriction imposed on this is due to the requirement that, for safety reasons, the proportion of hydrogen should not exceed the lower explosive limit of hydrogen/oxygen mixtures of 4% by volume. Furthermore, the solubility of hydrogen in the liquid reaction medium, which surrounds the catalyst particles as a thin film, is low. In order to achieve an economically acceptable product yield despite these limitations, the direct synthesis of hydrogen peroxide is carried out under a high gas pressure. However, the gas pressure drops considerably along the catalyst bed because of drag forces between solid and fluid phases, i.e. between the catalyst surface and the gas phase or the liquid phase, as the distance from the gas inlet increases. To compensate for this pressure drop, an unacceptably high power input is required for compressing the gas supply.

SUMMARY OF THE BACKGROUND

It is an object of the present invention to provide a process for preparing hydrogen peroxide by reaction of hydrogen and oxygen which can be carried out at a high gas throughput and a simultaneously low pressure drop.

We have found that this object is achieved by a process in which a) a stationary catalyst is installed in a reaction space, b) a liquid stream comprising water and/or a $C_1$–$C_4$-alkanol is passed through the reaction space and c) a gas stream comprising hydrogen and oxygen is simultaneously passed through the reaction space, wherein the apparent flow direction of the gas stream and the apparent flow direction of the liquid stream are not parallel to one another.

For the purposes of the present invention, the apparent flow direction or overall flow direction is the direction corresponding to the shortest possible path from the point at which the gas stream or the liquid stream enters the reaction space to the outlet. Viewed microscopically, the actual path of the gas or liquid molecules is generally more complex, since the direct path is, for example, blocked by catalyst particles and the molecules have to move around the catalyst particles. This can in extreme cases, depending on the particle shape, lead to deflection of the flow direction by 180° in very small observation windows. However, the direction changes forced by the catalyst particles will be disregarded for the present purposes.

According to the present invention, the apparent flow direction of the gas stream and that of the liquid stream should not be parallel, i.e. the flows should not be cocurrent or countercurrent. Rather, the apparent flow directions should be at an angle, preferably of from 15 to 165°, to one another. They are particularly preferably essentially perpendicular to one another.

It is advantageous to pass the liquid stream through the reaction space in the direction of gravity and to introduce the gas stream via the side walls bounding the reaction space. Unreacted constituents of the gas stream are taken off at the opposite side wall after passing through the reaction space. Openings which allow passage of gas are provided in at least parts of the side walls for the introduction and discharge of gas streams. The openings can be macroscopic openings, e.g. holes or slits, or microscopic channels of a gas-permeable porous material, e.g. a sintered metal or a gas-permeable ceramic. The individual openings in the side walls can be connected to individual gas feed lines and gas discharge lines. However, it is more practical for the side walls to separate the reaction space from at least one compartment which supplies gas and at least one compartment through which gas flows out from the reactor.

The pressure in the compartment which supplies gas decreases with increasing distance from the feed point. To ensure uniform supply of gas at each point of the reaction space, the resistance offered by the side wall bounding the reaction space to the passage of gas can be decreased approximately proportionally to the decreasing gas pressure. This can be achieved, for example, by increasing the number and the area of the openings or by increasing the porosity of the dividing wall in the flow direction of the gas in the compartment which supplies gas.

In preferred embodiments, the reaction space is located in a tall cylindrical reactor in which the apparent flow direction of the liquid stream is essentially parallel to the longitudinal axis of the reactor and the apparent flow direction of the gas stream is essentially perpendicular to the longitudinal axis. The apparent flow direction of the gas stream advantageously runs radially from the longitudinal axis to the circumference of the reactor. For the purposes of the present invention, a tall cylindrical reactor is one whose length is greater than its cross-sectional diameter. The aspect ratio, i.e. the quotient of length and width, is preferably at least 2, particularly preferably at least 3 and in particular in the range from 3.5 to 20.

The tall cylindrical reactor is preferably divided into three chambers by means of concentric cylindrical internals. The central cylindrical chamber serves as the compartment which supplies gas. The second chamber which surrounds this in an annular fashion comprises the actual reaction space. The outer annular space between the reaction space and the reactor wall is employed for the discharge of gas. It is also conceivable for the gas stream to be introduced via the outer annular chamber and to be discharged via the central cylindrical chamber, but preference is given to the variant in which the reaction gas flows radially outward.

As indicated above, openings which allow the passage of gas are provided at least in parts of the dividing walls between the central cylindrical chamber and the reaction space or between the reaction space and the outer annular chamber. The flow direction of the gas in the inner gas supply chamber can be from the top downward or, preferably, from the bottom upward.

In preferred embodiments, the gas stream is therefore fed into the reactor via a tube running essentially along the longitudinal axis of the reactor and is introduced into the reaction space through holes in the wall of the tube at the level of the reaction space. Unreacted constituents of the gas stream are preferably discharged from the reaction space through openings in the dividing wall surrounding the reaction space at the level of the openings in the wall of the feed tube.

The stationary catalyst is a heterogeneous catalyst located in a stationary fashion in the reaction zone, appropriately a bed of a particulate catalyst, structured packing or a monolithic catalyst. Suitable catalysts are all catalysts which comprise noble metals and are known to those skilled in the art as suitable for catalyzing the reaction of hydrogen and oxygen to form hydrogen peroxide, preferably catalysts whose active component comprises at least one metal of the platinum group, in particular palladium or combinations of palladium and platinum. If desired, they can further comprise additional metals such as rhodium, iridium, osmium, ruthenium, rhenium, gold, copper, cobalt, tungsten, molybdenum, holmium, tin or nonmetals such as phosphorus or boron.

The active composition of the catalysts is preferably applied to metallic or nonmetallic, porous or nonporous supports. Nonporous supports are preferred. They generally have a BET surface area of less than 5 $m^2/g$, preferably less than 0.2 $m^2/g$. To produce the catalyst, the noble metal is preferably deposited on the support by electroless means, for example by impregnating or wetting the support with a solution comprising the noble metal salt and a reducing agent.

The supports can have any shapes, for example sheets, wires, grids, gauzes, woven meshes or shaped bodies such as Raschig rings, saddles, wire spirals or wire mesh rings. The support can also be a monolithic support, i.e. a solid body which is permeated by a multiplicity of flow channels and therefore has a large surface area.

Metal supports can consist of any metals or metal alloys, preferably stainless steel.

Suitable nonmetallic supports include activated carbon, graphite, mineral materials, plastics and combinations thereof. Suitable mineral materials are natural or synthetic minerals, glasses or ceramics, in particular water-insoluble oxides, mixed oxides, sulfates, phosphates and silicates of the alkaline earth metals, aluminum, silicon, tin, titanium or zirconium. Suitable plastics are natural or synthetic high polymers.

Supports which have been found to be particularly useful are spheres or pellets of steatite, aluminum oxide, silicon dioxide, activated carbon, graphite, glass or stainless steel.

Preferred catalysts comprise palladium or a combination of palladium and platinum as active component on a nonmetallic, nonporous support.

Preference is given to using particulate catalysts which can be used as a fixed bed. The particle size is generally in a range from 0.01 to 5 mm, in particular in the range from 0.05 to 3 mm. The support shape should be chosen so that the pressure drop due to drag forces at the phase boundary between solid catalyst phase and gas phase or liquid phase is not too great, but at the same time a sufficiently large reaction surface area, i.e. a sufficiently large area for contact between the reaction gases and the catalyst, is offered. The pressure drop over the entire reaction space is preferably less than 5 bar, in particular less than 3 bar.

The noble metal content of the catalyst is generally from 0.001 to 1.0% by weight, based on the weight of the catalyst.

The reaction space either consists of a single continuous space or is divided by means of suitable internals into discrete superposed reaction zones. The stationary catalyst substantially fills the reaction space or the individual reaction zones.

When superposed reaction zones are used, the liquid stream flowing down from one reaction zone is collected by means of trays located between the reaction zones and is distributed over the reaction zone underneath, e.g. by means of a distributor such as a perforated plate. The liquid stream is preferably held up on the trays located between the individual reaction zones and discharged via siphon-like overflows. The held-up liquid acts as a gas barrier which ensures that the gaseous stream does not flow into an adjacent reaction zone but leaves the reaction zone via, for example, the openings provided in the side wall.

The hydrogen peroxide formation taking place in the reaction space is exothermic, so that the temperature of the liquid stream increases during passage through the reaction space. Hydrogen peroxide is heat-sensitive and excessive heating of the liquid stream is therefore to be avoided. For this reason, to prevent excessive heating of the liquid phase, the liquid stream is preferably cooled during its passage through the reaction space. Heat exchangers can advantageously be installed in the reaction space for this purpose. The heat exchangers are generally configured as tubes or plates through which a cooling medium flows and which are in contact with the liquid stream, for example so that the liquid stream flows down over the heat exchangers. The distance between two parallel cooling surfaces can be, for example, from 5 to 500 mm, preferably from 10 to 200 mm. The heat exchangers can run through the entire reaction space. When using a reaction space divided into individual reaction zones, the liquid stream is preferably cooled between the individual reaction zones, i.e. the heat exchangers are located between the individual reaction zones. In a preferred embodiment of the latter case, the heat exchangers form an integrated unit with the abovementioned trays for collecting or holding up the liquid stream or are connected with these in such a way that heat can be conducted between them. To ensure better heat transport, the cooling zone can also be filled with an additional catalyst bed and/or a bed of inert packing elements.

The molar ratio of oxygen to hydrogen in the gas stream fed in is generally from 2:1 to 1000:1, preferably from 5:1 to 100:1, particularly preferably from 20:1 to 50:1. Apart from the reaction gases hydrogen and oxygen, the gas stream may also further comprise at least one inert gas, for example nitrogen or argon. The use of an inert gas can be advantageous in order to avoid the hitherto problematical handling of compressed gases having a high oxygen content. When an inert gas is used, the proportion of inert gas is appropriately from 50 to 80% by volume, preferably from 60 to 80% by volume and in particular from 70 to 80% by volume. Oxygen can also be used in the form of air. The proportion of hydrogen should preferably not exceed the lower explosive limit of 4% by volume at any point of the reaction. The gas stream which leaves the reaction space and has been depleted in oxygen and hydrogen is generally admixed with fresh oxygen and hydrogen and returned to the reaction space. If the gas stream comprises an inert gas, the replacement of the oxygen and hydrogen consumed in the reaction is preferably carried out using essentially pure oxygen or hydrogen so as to avoid accumulation of the inert gas in the gas stream.

The liquid stream which dissolves the hydrogen peroxide formed at the catalyst surface and transports it from the reaction space comprises water and/or a $C_1$–$C_4$-alkanol, preferably solely water. When the liquid stream comprises a $C_1$–$C_4$-alkanol, the gas stream preferably comprises an inert gas. In addition, the liquid stream advantageously further comprises stabilizers which are designed to prevent the decomposition of hydrogen peroxide.

As stabilizers, it is possible to use acids whose $pK_a$ is preferably less than that of acetic acid, in particular mineral acids such as sulfuric acid, phosphoric acid, hydrobromic acid or hydrochloric acid. The acid concentration is generally at least $10^{-4}$ mol/l, preferably from $10^{-3}$ to $10^{-2}$ mol/l. Furthermore, small amounts of halides such as chloride or bromide, pseudohalides or formaldehyde in concentrations of, for example, from 1 to 1000 ppm, preferably from 3 to 300 ppm, can also be added. Particular preference is given to using hydrobromic acid in concentrations of from 1 to 2000 ppm, in particular from 10 to 500 ppm, since it combines the function of acid and halide.

If desired, the liquid stream can also be passed through the reaction space a number of times to achieve hydrogen peroxide concentrations higher than those achieved in a single pass.

The liquid throughput (per unit horizontal cross-sectional area of the reaction space) is generally in the range from 0.1 to 100 $m^3/m^2xh$, preferably in the range from 1 to 50 $m^3/m^2xh$.

The ratio of gas throughput (at STP, i.e. at 0° C. and 1013 mbar) and liquid throughput is generally from 2 to 20000, preferably from 5 to 15000 and particularly preferably from 5 to 12000. At these gas/liquid ratios, the gas phase generally forms a coherent phase in the reaction space, while the liquid phase is present as a disperse phase, i.e. in the form of fine droplets.

The temperature in the reaction space is generally from 0 to 80° C., preferably from 5 to 70° C. and particularly preferably from 25 to 60° C. The total pressure of the gas stream is generally from 1 to 300 bar, preferably from 10 to 200 bar and particularly preferably from 10 to 80 bar.

The invention further provides an apparatus which is designed specifically for carrying out the process of the present invention. It comprises an essentially cylindrical reactor 1, a gas feed tube 2 leading into the reactor 1 essentially along the longitudinal axis of the reactor, a reaction space 3 which is located in the reactor 1 and surrounds the gas feed tube 2 in an annular fashion at least in sections and is surrounded on its external circumference by a dividing wall 6 located at a distance from an outer wall 15 of the reactor, where openings 16a, 16b which allow passage of gas are provided in the wall 5 of the gas feed tube 2 and in the dividing wall 6 at the level of the reaction space 3, means 14 which allow discharge of gases from the reactor and are open to an annular space 4 between the dividing wall 6 and the outer wall 15 of the reactor 1, means 10, 11 for supplying an upper cross-sectional area 17 of the reaction space 3 with liquid, and means 12 for taking off the liquid which has flowed through the reaction space and exits through its lower cross-sectional area 18.

The reaction space of the apparatus of the present invention is preferably divided into a plurality of reaction zones located along the longitudinal axis of the reactor. Cooling zones for cooling the liquid flowing through the reaction space are preferably located between successive reaction zones. The openings provided in the wall of the gas feed tube to allow passage of gas are appropriately configured as slits whose area preferably increases in the flow direction of the gas. As an alternative, the wall of the gas feed tube comprises, at least in some regions, a porous material whose porosity preferably increases in the flow direction of the gas.

BRIEF DESCRIPTION OF THE DRAWINGS

The accompanying figures and the examples below illustrate the invention.

DESCRIPTION OF THE PREFERRED EMBODIMENTS

Figure 1:
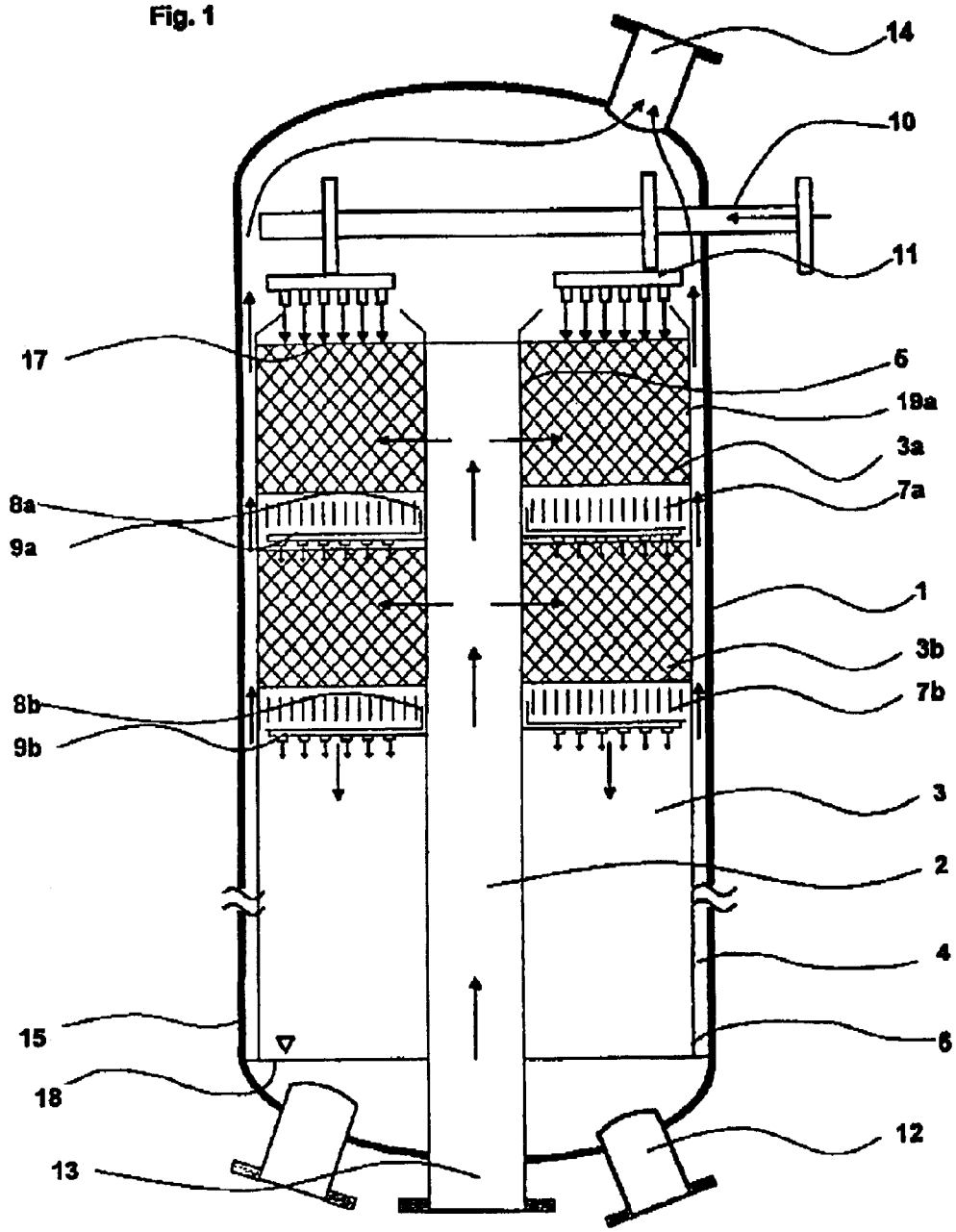
FIG. 1 shows a longitudinal section through a reactor suitable for carrying out the process of the present invention.

In FIG. 1, the reactor 1 comprises a central gas feed tube 2, a reaction space 3 which has an annular cross section and is divided into a plurality of reaction zones 3a, 3b, and an outer annular space 4 for the discharge of gas. The wall 5 of the gas feed tube is provided with openings 19a, 19b. A dividing wall 6 which is likewise provided with openings 19a, 19b separates the annular space 4 from the reaction space 3. The reaction zones 3a, 3b are charged with a random bed of a particulate supported noble metal catalyst. The liquid stream is introduced into the reactor 1 via the line 10 and is distributed over the cross section of the reaction space by means of the distributor 11. The liquid stream leaves the reactor 1 through the openings 12 at the bottom of the reactor 1. The gas stream is introduced into the reactor via the opening 13, flows through the gas feed tube 2 and passes through the slits in the wall 5 of the gas feed tube 2 into the reaction zones 3a, 3b. The gas feed tube 2 is closed at the upper end at the level of the upper edge of the catalyst bed. After passing through the reaction zones 3a, 3b, the gas stream goes through the openings 19a, 19b of the dividing wall 6, is collected in the annular space 4 and leaves the reactor 1 through the opening 14. Between two reaction zones 3a, 3b there is in each case a cooling zone 7a, 7b in which the descending liquid is passed over a plate cooler. The liquid is held up in the cooling zones 7a, 7b, leaves these via an overflow 8a, 8b and is uniformly distributed over the cross section of the reaction zone 3b underneath by means of distributor tubes 9a, 9b.

Figure 2:
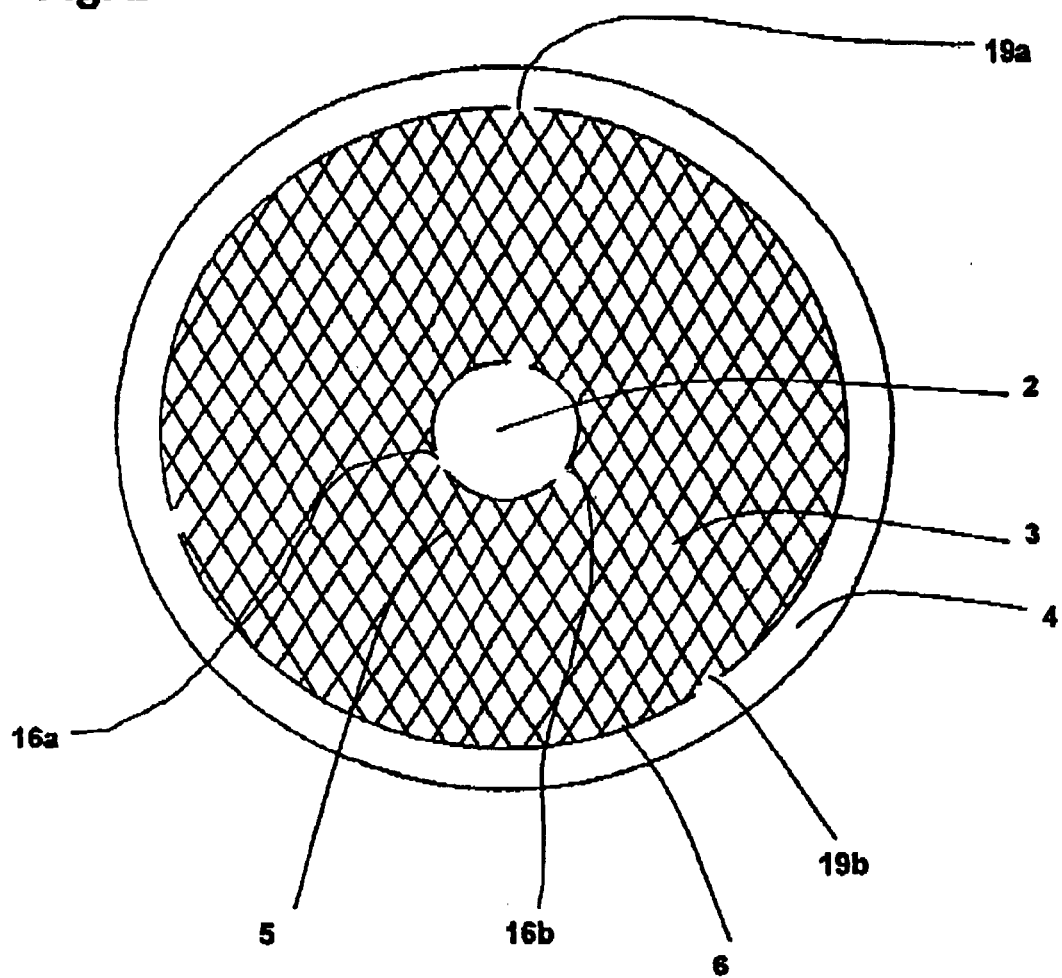
FIG. 2 shows a cross section through the reactor of FIG. 1.

FIG. 2 shows a cross section of the central gas feed tube 2, the wall 5 of the gas feed tube, the reaction space 3, the annular space 4 and the dividing wall 6.

Figure 3:
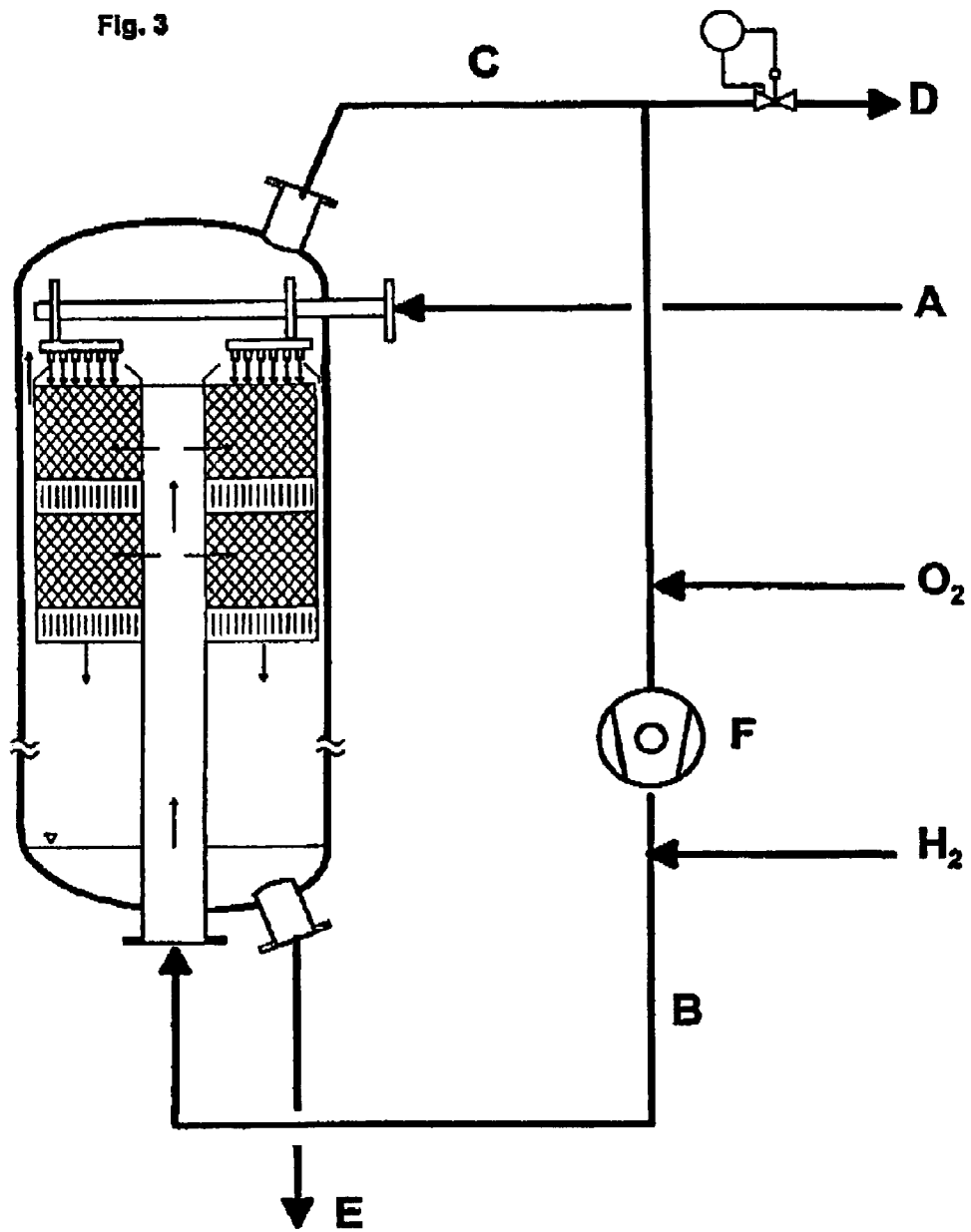
FIG. 3 schematically shows a plant which incorporates the reactor of FIG. 1.

FIG. 3 schematically shows a plant suitable for carrying out the process of the present invention, which comprises the reactor of FIG. 1 together with a circulating gas line B, C and a compressor F and also means of feeding oxygen $O_2$ and hydrogen $H_2$ into the circulating gas line B, C. The plant also has a vent D through which part of the circulating gas can be discharged via a pressure regulator in order to prevent accumulation of inert gases in the circulating gas. A liquid stream A is fed into the reactor and a hydrogen peroxide solution E is taken off.

CATALYST PRODUCTION EXAMPLE 1

5 $m^3$ (gross volume as poured) of steatite spheres having a diameter of from 1.8 to 2.2 mm were impregnated on a box filter with a solution of 15 kg of tin(II) chloride and 30 l of hydrochloric acid in 3 $m^3$ of water. The solution was allowed to seep through the spheres and the bed was washed with 5 $m^3$ of water. A solution of 1000 g of palladium chloride and 5 l of concentrated hydrochloric acid in 3 $m^3$ of water was subsequently allowed to seep through the steatite spheres, the filtrate was collected and the bed was once again rinsed with water. The procedure was repeated one more time. The spheres were then dried overnight at 50° C. and 100 mbar.

The spheres which had been activated in this way were then placed in a double-walled tube which was connected to a pump for circulating liquid. The jacket of the tube could be heated by means of hot/warm water. After addition of a solution of 273 kg of sodium hypophosphite, 616 kg of ammonium chloride and 911 l of 25% strength ammonia in 7350 l of water, the tube was heated to 40° C. while maintaining pumped circulation of the liquid. A solution of 1226 g of sodium tetrachloropalladate and 7 g of hexachloroplatinic acid in 120 l of water was added and the mixture was circulated for a further period. After 20 minutes, the liquid was drained and the catalyst was washed free of salts by means of water.

The procedure was repeated nine times, so that 50 m$^3$ of catalyst were obtained at the end.

CATALYST PRODUCTION EXAMPLE 2

The catalyst was produced by a method analogous to that of example 1, but the steatite spheres used had a diameter of from 1.0 to 1.5 mm.

EXAMPLE 1

A plant as shown in FIG. 3 was used. The reactor had an external diameter of 2.6 m and a height of 23.6 m. The reaction space had an external diameter of 2.3 m, an internal diameter of 0.5 m and extended from above the bottom region (1.9 m from the lower end of the reactor) to below the top region (2.2 m from the upper end of the reactor). The catalyst volume was 49 m$^3$. The reaction space was made up of 16 reaction zones with 15 cooling zones located between them. The reaction zones were filled with the catalyst produced as described in catalyst production example 1. A liquid stream A which had been preheated to 43° C. was introduced via a liquid distributor and distributed uniformly over the surface of the uppermost reaction zone. The liquid trickled through the uppermost reaction zone and took up the hydrogen peroxide formed over the catalyst. The liquid was held up in the first cooling zone and cooled by indirect heat exchange. After leaving the cooling zone, the liquid was distributed through a perforated plate over the catalyst bed of the next reaction zone through which it once again trickled to the next cooling zone. This was repeated over all reaction zones. At the bottom of the reactor, the liquid stream comprising hydrogen peroxide was collected and cooled.

The temperature of the liquid phase increased by 12° C. while flowing through each of the 0.75 m high catalyst rings before it was cooled back down to 43° C. in the cooling unit. The process was carried out at a nominal pressure of 64 bar.

The reaction gas B comprising oxygen and hydrogen was circulated by means of the compressor F (single-stage turbo compressor having a capacity of 8500 m$^3$/h (600 kW); $p_{in}$=48 bar, $p_{out}$=50 bar). Further oxygen and hydrogen were metered into this circulating stream in such amounts that a constant H$_2$ content of 3.5% by volume was established at the inlet of the reactor. A pressure regulator in the offgas line D via which the inert gases were discharged regulated the reactor pressure. The circulating gas flowed into the reactor via the inlet opening 13 into the central gas feed tube 2. Owing to the pressure decrease from the middle to the outside of the reaction zones, the gas flowed from the gas feed tube 2 through the wall 5 and radially outward through the individual reaction zones transverse to the descending liquid into the outer annular space 4. Displacement bodies can be installed in the gas feed tube 2 and the annular space 4 to reduce the dead space. From the outer annular space 4, the gas was conveyed into the upper dome of the reactor 1 and left the reactor 1 via the outlet opening 14.

Parameters for the hydrogen peroxide synthesis are given below.

| Parameter: | |
|---|---|
| Amount of circulating gas | 478000 kg/h |
| H$_2$ at inlet | 3.5% by volume |
| H$_2$ at outlet | 2.5% by volume |
| O$_2$ feed | 3346 standard m$^3$/h |
| H$_2$ feed | 3450 standard m$^3$/h |
| Offgas | 8.1 m$^3$/h |
| Aqueous feed | 35000 kg/h |
| Composition: | Aqueous solution containing 0.4% by weight of sulfuric acid, 0.1% by weight of phosphoric acid and 200 ppm of hydrobromic acid |
| Feed temperature | 43° C. |
| Product output | 39610 kg/h of aqueous solution containing 9.89% by weight of H$_2$O$_2$ |
| Product temperature | 55° C. |

EXAMPLE 2

Example 1 was repeated using the catalyst from catalyst production example 2 and, as circulating gas compressor F, a single-stage turbocompressor having an effective capacity of 13000 m$^3$/h (1000 kW) with $p_{in}$=47 bar and $p_{out}$=50 bar. The parameters for the hydrogen peroxide synthesis using this catalyst are shown in the following table.

| Parameter: | |
|---|---|
| Amount of circulating gas | 723000 kg/h |
| H$_2$ at inlet | 3.5% by volume |
| H$_2$ at outlet | 2.5% by volume |
| O$_2$ feed | 4960 standard m$^3$/h |
| H$_2$ feed | 5193 standard m$^3$/h |
| Offgas | 12.3 m$^3$/h |
| Aqueous feed | 47300 kg/h |
| Composition: | Aqueous solution containing 0.4% by weight of sulfuric acid, 0.1% by weight of phosphoric acid and 200 ppm of hydrobromic acid |
| Feed temperature | 43° C. |
| Product output | 54126 kg/h of aqueous solution containing 10.46% by weight of H$_2$O$_2$ |
| Product temperature | 55° C. |

We claim:

1. A process for preparing hydrogen peroxide by reaction of hydrogen and oxygen, in which
    a) at least one stationary catalyst comprising a noble metal is installed in a reaction space,
    b) a liquid stream comprising water and/or a C$_1$–C$_4$-alkanol is passed through the reaction space and
    c) a gas stream comprising hydrogen and oxygen is simultaneously passed through the reaction space,
    wherein the apparent flow direction of the gas stream and the apparent flow direction of the liquid stream are not parallel to one another.

2. A process as claimed in claim 1, wherein the reaction space is located in a tall cylindrical reactor and the apparent flow direction of the liquid stream is essentially parallel to the longitudinal axis of the reactor and the apparent flow direction of the gas stream is essentially perpendicular to the longitudinal axis.

3. A process as claimed in claim 2, wherein the apparent flow direction of the gas stream runs radially from the longitudinal axis to the circumference of the reactor.

4. A process as claimed in claim 3, wherein the gas stream is fed into the reactor via a tube running essentially along the longitudinal axis of the reactor and is introduced into the reaction space through openings in the wall of the tube at the level of the reaction space.

5. A process as claimed in claim 4, wherein unreacted constituents of the gas stream are discharged from the reaction space through openings in the dividing wall surrounding the reaction space at the level of the openings in the wall of the tube.

6. A process as claimed in claim 1, wherein an inert gas is present in the gas stream.

7. A process as claimed in claim 1, wherein at least one bed of a particulate catalyst is used as stationary catalyst.

8. A process as claimed in claim 7, wherein the catalyst comprises palladium or a combination of palladium and platinum as active component on a nonmetallic, nonporous support.

9. A process as claimed in claim 1, wherein the liquid stream is cooled during its passage through the reaction space.

10. A process as claimed in claim 1, wherein the reaction space comprises a plurality of superposed reaction zones.

11. A process as claimed in claim 10, wherein the liquid stream is held up between the reaction zones.

12. A process as claimed in claim 10, wherein the liquid stream is cooled between the reaction zones.

* * * * *